United States Patent
Plichta

[15] 3,673,899
[45] July 4, 1972

[54] WORKPIECE RECLAIMING APPARATUS
[72] Inventor: Dietmar G. Plichta, Oakland, Calif.
[73] Assignee: Kaiser Aluminum & Chemical Corporation, Oakland, Calif.
[22] Filed: Dec. 11, 1970
[21] Appl. No.: 97,153

[52] U.S. Cl. ..................................................83/4, 90/38 A
[51] Int. Cl. ...........................................................B23d 7/10
[58] Field of Search..................83/4, 3, 1; 156/584; 90/38 A, 90/38 R, 24 D, 24 E

[56] References Cited

UNITED STATES PATENTS

3,081,673   3/1963   Ansel ....................................90/24 E
3,399,585   9/1968   Ahlert............................................83/3

Primary Examiner—James M. Meister
Attorney—James E. Toomey, Paul E. Calrow, Harold L. Jenkins and John S. Rhaades

[57] ABSTRACT

An apparatus for reclaiming metal cladding or the like from an elongated clad workpiece, with minimal or no damage to the workpiece, so that it can be reused. The apparatus includes an improved carriage-mounted shearing tool that is advanced or walked progressively along the workpiece and after making an initial separation of the cladding from the workpiece completes the separation by a unique peeling of the cladding from the workpiece. The apparatus may also be provided with an impact type tool for use in the decladding operation.

16 Claims, 10 Drawing Figures

WORKPIECE RECLAIMING APPARATUS

BACKGROUND OF THE INVENTION

This invention relates to an apparatus for reclaiming metal cladding from an elongated workpiece. More particularly, it relates to an improved apparatus for removing metal cladding or the like from an elongated metal workpiece, such as a metal rail, in a progressive and efficient manner with minimal or no damage to the rail.

Various workpiece reclaiming or treating apparatus of the type with which the instant invention is concerned are exemplified by U.S. Pat. No. 3,081,673 to Ansel, granted Mar. 19, 1963, and U.S. Pat. No. 3,399,585 to Ahlert granted Sept. 3, 1968. These prior art apparatus have had certain deficiencies in that they have not been designed to remove a mass of cladding from an elongated workpiece and for the full length thereof in a single and incremental stroke of a shearing tool.

The apparatus of the instant invention is capable of removing a mass of metal cladding from a length of metal rail for the entire length of the rail in progressive and incremental strokes of a shearing tool that can be mounted on a carriage in an improved fashion.

The shearing device is advanced at all times in a fully controlled manner relative to the workpiece. By reason of the fact that the shearing device is always under the precise control of the operator, there is minimal or no damage to the workpiece during the shearing operation. The absence of damage to the base portion of a workpiece or rail enables ready reclamation and reuse of the workpiece and a significant reduction in the overall cost of mass producing clad workpieces of the type under consideration.

SUMMARY OF THE INSTANT INVENTION

A primary purpose of the instant invention is to provide an improved device for reclaiming metal cladding from an elongated metal clad workpiece, said device comprising a shearing tool mounted on a carriage and adapted to move in progressive strokes alone the workpiece for the entire length thereof.

The carriage and the shearing tool are provided with improved means for holding and guiding the shearing tool along the rail or the like to be worked on.

The apparatus of the instant invention has various uses and is particularly useful in removing the cladding from a clad third rail of the type disclosed and described in U.S. Pat. No. 3,544,737 of Thomas A. Nowak, which issued Dec. 1, 1970. Thus the clad rail can comprise an I-shaped beam having an apertured web, with cast cladding material bonded to opposite sides of the web and intermediate the flanges of the I-beam and filling the web apertures. The shearing tool of the instant invention is adapted to progressively separate and coil up the cladding from one side of the web, for example, the top side of the web, during advancement of the carriage into and along the initially clad rail. After decladding and coiling of the cladding on one side of the rail, the apparatus can employ an impact type of tool, such as a conventional hammer, for separating the cladding on the other side of the rail from the rail.

The carriage of the apparatus can be advantageously provided with a workpiece coupling pin for engaging both the rail and the cladding material separated from the bottom of the rail, so as to remove the separated cladding and rail from the working or decladding area at the end of the reclaiming operation.

DETAILED DESCRIPTION

Figure 1A:
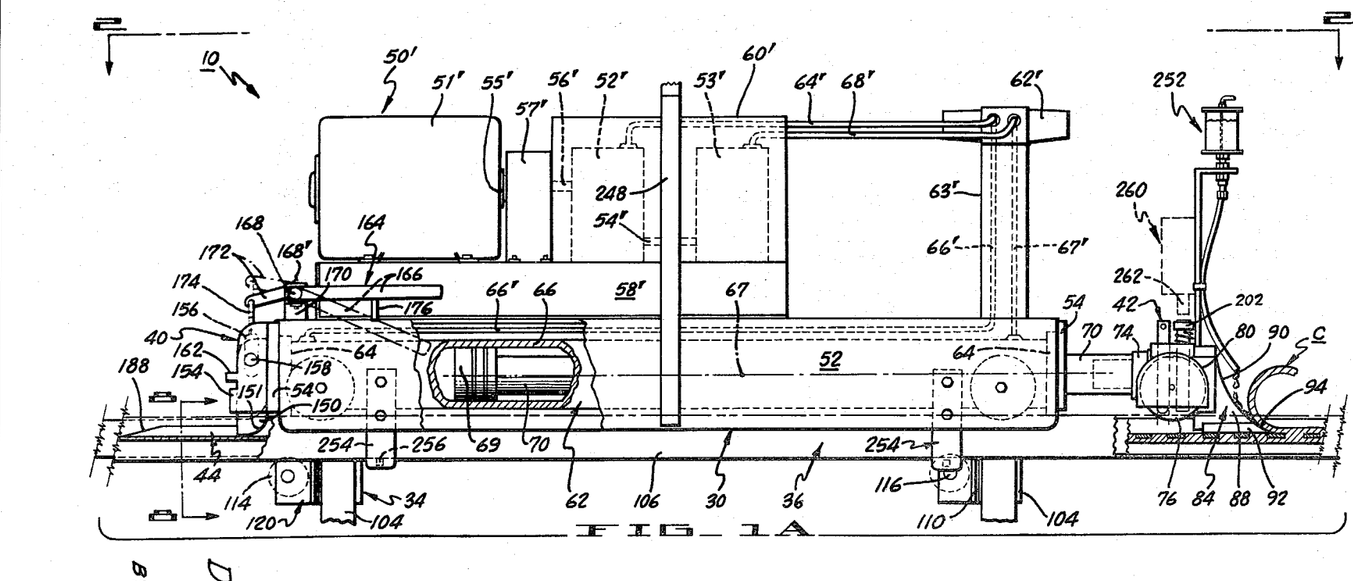
FIG. 1A is a fragmentary side elevational view of a preferred embodiment of a workpiece reclaiming apparatus of the instant invention.
Figure 1B:
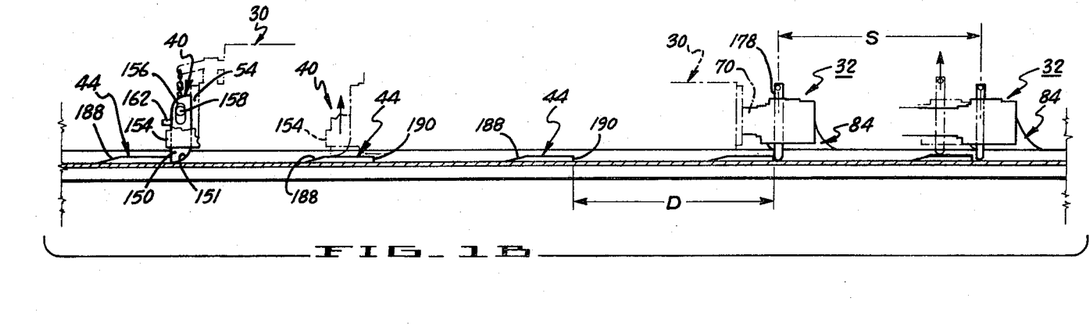
FIG. 1B is a somewhat reduced fragmentary and somewhat schematic side elevational view of certain anchoring elements for the apparatus of FIG. 1 and illustrates in dotted and solid lines several operative positions of these elements.
Figure 2:
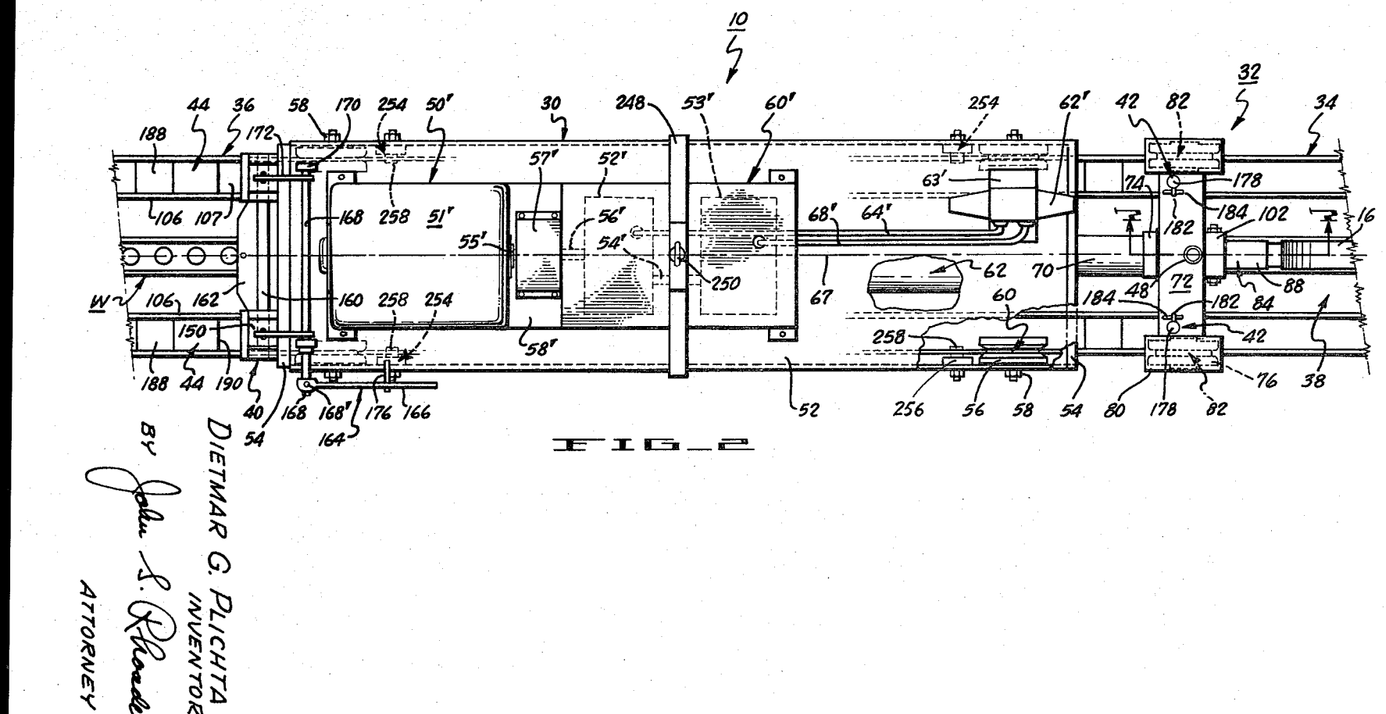
FIG. 2 is a top plan view of the apparatus of FIG. 1 with portions removed and, when taken along line 2—2 of FIG. 1A.
Figures 3, 4, 5, 6:
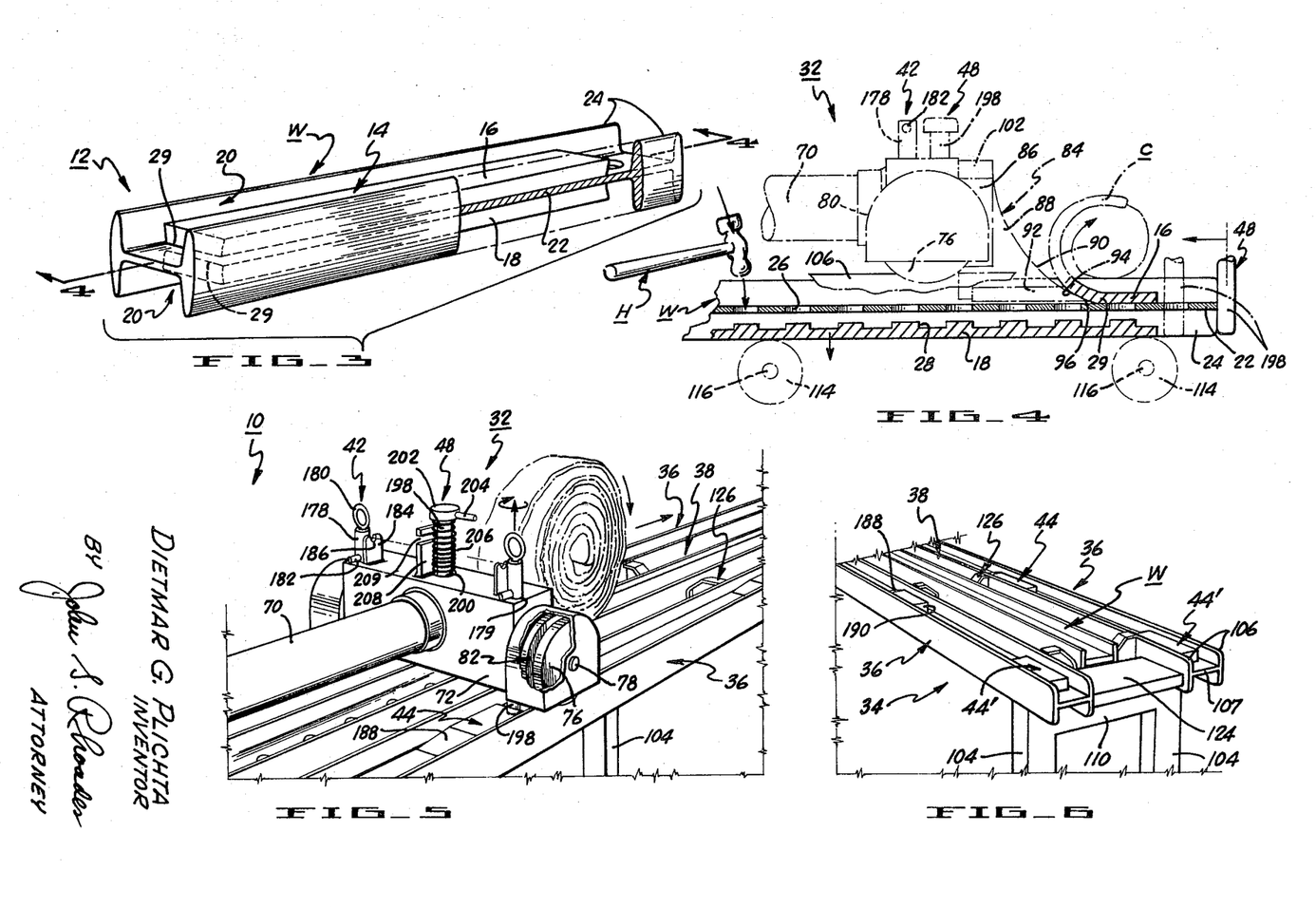
FIG. 3 is an enlarged fragmentary perspective view of a clad rail workpiece that can be worked on by the apparatus of the instant invention, with parts broken away.
FIG. 4 is a cross-sectional view taken along line 4—4 of FIG. 3, with parts of the shearing tool added in dotted lines and illustrates progressive decladding or removal of the clad material from the workpiece.
FIG. 5 is an enlarged fragmentary perspective view of the right-hand end of the apparatus as depicted in FIG. 1A.
FIG. 6 is an enlarged fragmentary perspective view of the right-hand end of the framework for mounting the shearing tool, as viewed in FIG. 1A.

With further reference to the drawings and particularly FIG. 1A, 1B, and 2, a preferred embodiment of the reclaiming apparatus of the instant invention is used to declad an elongated composite metal rail W in a continuous and progressive manner. The composite rail W can comprise an I-shaped steel rail provided with a base portion 12 having an apertured web and aluminum cladding material 14 cast in place in the channels between the flanges, all as indicated in FIGS. 3-4.

The cladding 14 can comprise clad portions 16 and 18 disposed in recesses 20 on opposite sides of web 22 of rail 12 and between opposed flanges as well as rivet portions 28 that fill the web apertures 26 of workpiece W. Even though upper and lower clad sections 16 and 18 are mechanically bonded to opposite sides of the web 22 and interlocked by portions 28, the reclaiming apparatus 10 can separate the upper and lower clad sections 16 and 18 from the rail or base element and each other at the line of rail and cladding jointure 29 without any or most minimal injury to the rail so that it can be reused without expensive reconditioning being required.

Apparatus 10 generally comprises a carriage 30 having an extendable tool 32 for shearing and peeling the cladding from the clad workpiece W, all mounted on a table-like framework or trackway 34. The framework includes a pair of opposing and spaced parallel tracks 36 which support carriage 30 and run for substantially the full length of framework 34. As best indicated in FIGS. 2, 5–6 and 8–9, framework 34 also includes an elongated pocket 38 interposed between the pair of tracks 36. Pocket 38 has suitable locks for receiving and positively holding a workpiece W in operative relation to tool 32 during operation of the apparatus.

Retractable anchoring lug-type elements 40 and 42 are carried on opposite sides of carriage 30 and disposed in alignment with the tracks 36. A series of longitudinally spaced stop blocks 44 are suitably mounted in the tracks 36 and stop block elements 44 are adapted to engage lug-type elements 40 and 42 and to act as anchor elements for carriage 30 during operation of the instant apparatus, as will be described more fully hereinafter. An impact type of tool to be described hereinafter can be carried by apparatus 10 for separating lower cladding 18 and rivets 28 from rail 12 after the shearing tool 32 has peeled the upper cladding 16 from rail 12. Alternately, the operator can use a hammer H to drive the cladding from holes 26 in the rail.

If desired, shearing tool 32 can be provided with a workpiece coupler pin 48 that can fit in the openings of web W of the rail after the rivet material has been removed for the purpose of ejecting the reclaimed rail from apparatus 10, as will be hereinafter described.

In manufacture of rail W, while the I-beam 12 may be on the order of 60 feet in length, the cladding will be of somewhat less length. This factor facilitates the alignment and engagement of shearing tool 32 with one end of upper cladding 16 prior to effecting separation of the I-beam and the cladding. Since the particular manner by which cladding is cast on and about an I-beam to form a workpiece W does not constitute part of the instant invention, no discussion of the same will be given, and reference can be made to the aforementioned Nowak patent for one method for cladding the workpiece W.

The clad workpiece W is usually reclaimed by the apparatus of the instant invention because it has been rejected as failing to meet certain production specifications. For example, slight non-tolerable thickness variations may occur in one of the cladding sections. Even though a roll-formed base rail 12 or workpiece W may not be absolutely straight from one end to the other, the apparatus of the instant invention will still effectively separate the cladding 14 from a rail 12 with no or minimal injury to the rail.

In an advantageous embodiment of the invention, carriage 30 is generally comprised of a channel-shaped plate 52 which serves as an overall housing and of opposed end plates 54 which close off the open ends of housing 52. Housing 52 is equipped with idler wheels 56. A given wheel 56 is mounted on a stub-shaft 58 projecting from the inner face of plate 52, as shown in FIGS. 1A and 2, and wheel 56 has a groove 60 that interfits with flange element 106 on tracks 36.

An extendable shearing tool 32 is carried by housing 52 and includes a fluid actuator 62 disposed therein. As depicted in FIG. 1, the opposed end plates 64 of the fluid cylinder of actuator 62 extend between and are connected to the opposed inside surfaces of carriage end plates 54. In connecting plates 64 of actuator 62 to the end plates of carriage 30, the longitudinal axis 67 of the actuator is preferably arranged so as to be aligned with the longitudinal axis 68 of the framework of the apparatus as shown in FIGS. 1A and 2. As illustrated in FIG. 1A, a piston rod subassembly comprised of a double acting piston 69 is disposed in the cylinder 66, and a piston rod is connected to the piston 69. The forward end of the rod 70 extends through aligned apertures in plate 64 and 54 at the right-hand end of carriage 30, as viewed in FIG. 1A.

A hydraulic control system 50' is used to operate piston 69, as indicated in FIGS. 1A and 2. System 50' is generally comprised of a pump motor 51' that drives a hydraulic fluid pump 52' and a reservoir 53' for supplying fluid to pump 52' through supply conduit 54'. Motor 51' is connected to pump 52' by way of motor input shaft 55', pump input shaft 56' and a clutch 57' is interposed between and interconnected to input shafts 55' and 56', as best indicated in FIGS. 1—2. Motor 51', clutch 57', pump 52' and reservoir 53' are all advantageously mounted on a platform 58' affixed to the top of carriage housing 52. If desired, pump 52' and reservoir 53' can be enclosed by a common housing 60'. A solenoid operated valve 62' mounted on an upstanding bracket 63' affixed to the right end of carriage 52 is operatively connected to pump fluid outlet conduit 64' for selectively directing fluid under pressure to either side of piston 69 by way of supply conduits 66' and 67' connected to opposite ends of cylinder 66 in the manner shown in FIG. 1A. Exhaust conduit 68' extending between and interconnected to valve 62' and reservoir 53' returns fluid form cylinder 66 to the reservoir through line 66' or 67' whenever valve 62' directs fluid under pressure from pump 52' to cylinder 66 through pump outlet 64' and line 67' or 66' as the case may be. Thus, valve 62' functions to selectively direct fluid under pressure to opposite sides of piston 69 so as to cause advancement of the same in opposite directions, thereby causing corresponding and opposing stroke movements S of shearing tool 32 to take place during operation of apparatus 10.

Shearing tool 32 can be comprised of a main cross and support bar element 72 equipped with a socket 74 for receiving in interlocked relationship the free end of rod 70 of piston rod subassembly. The opposite ends of cross bar 72 are equipped with grooved idler wheels 76 mounted on stub shafts 78. Covers 80 can be used for wheels 76, if desired, and the grooves 82 of wheels 76 interfit with flanges on the tracks 36.

Figure 7:
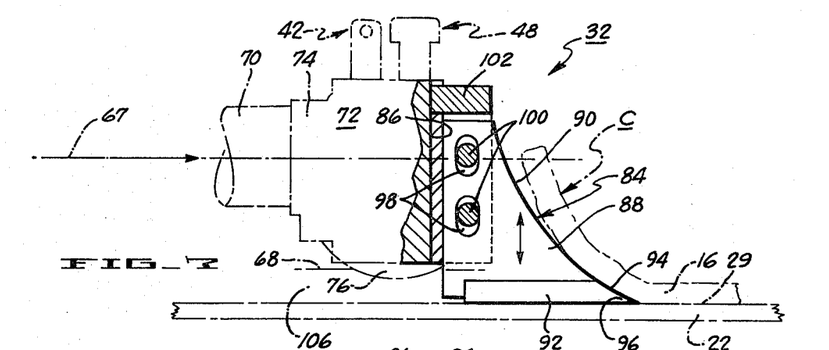
FIG. 7 is an enlarged cross-sectional view of the head end of the shearing and peeling tool, with certain elements removed as viewed from line 7—7 of FIG. 2.

The leading end of tool 32 is rigged with a shearing plow 84. Plow 84 is comprised of a channel-shaped support 86 and a heavy duty shearing blade 88, floatable connected thereto. As best illustrated in FIGS. 2, 4 and 7, the web of channel 86 is affixed to the right-hand side of bar 72 and disposed in centered relation to the longitudinal axis 67 of actuator 72. Blade 88 is provided with an outwardly facing concave surface 90 that facilitates shearing of a cladding section from a workpiece W during formation of the severed cladding into a progressively built-up coil C as the blade traverses the clad rail. Blade 88 has a bottom cutaway section within which a cutting blade insert 92 can be mounted. The concave right-hand side 94 of blade insert 92 constitutes a smooth and uninterrupted extension of the concave surface 90 of blade 88 and insert 92 includes a cutting edge 96.

Shear 88 has a width that is somewhat less than the distance between the flanges 87 of channel 86. This allows blade 88 to be freely inserted and floated between the flanges 87 of support 86. A pair of vertically aligned and relatively spaced closed end slots 98 extend between opposed major side faces of blade 88. After blade 88 is inserted between the opposed flanges of support 86, a nut-stud assembly 100 is passed through each blade slot 98 and openings in the opposed flanges of support 86 whereby blade 88 can be slidably and floatably mounted to support 86. If desired, a cover plate 102 can extend between and be connected to the upper end of channel support 86 for limiting excessive movement of blade 88 relative to its support during operation of the apparatus.

The width of blade 88 is also somewhat less than the width of the channel recess 20 of a rail W. Because of blade 88 being slidably and floatingly mounted to channel 86, blade cutting edges 96 maintain substantial alignment with the point of juncture 29 between a section of cladding 16 and rail web 22 upon progressive separation of upper cladding 16 during operation of the apparatus despite slight variations in web straightness along the length of workpiece W, such as for example, a slight helical twist of the workpiece from one end to the other. By virtue of blade cutting edge 96 maintaining substantial alignment with the jointure line 29 between a cladding section 16 and the workpiece web, injury to the workpiece base 12 such as, for example, gouging, etc., is for all practical purposes prevented. Since blade 88 is free to float in channel 86 and has a width less than the opposed flanges 87 and 24 of channel 86 and workpiece base element 12, respectively, as aforedescribed, blade 88 can be freely advanced along and for the full length of the workpiece without binding engagement occurring between workpiece and tool.

In another advantageous embodiment of the instant invention, each track 36 is comprised on an I-shaped element mounted on supports 104 and having opposed flanges 106 and a web 107. The bracing element 110 extends between and is connected to a pair of transversely aligned supports or legs 104 at their upper ends. If desired, a reinforcing cover plate 108 can be connected to the upper end of a given leg 104 prior to attachment of the leg to a track 36.

Workpiece pocket 38 of framework 34 interposed between tracks 36 substantially extends from one end of the framework to the other and is equipped with a series of longitudinally spaced idler rolls 114 attached to cross braces 110 for rotatably engaging and supporting the bottom longitudinal edges of the opposed flanges 24 of workpiece W when the workpiece is placed in a pocket 38 in the manner illustrated in FIGS. 1A, 5–6 and 8.

Rollers 114 are attached to cross braces 110 by way of roller stub shafts 116 and arranged in openings in bracket flanges 122. A plate 124 arranged across opposed flanges 106 of the pair of tracks 36 and disposed above the level of rollers 114 serves as a simple stop for engaging the end of a workpiece W to prevent the movement thereof during operation of the apparatus.

In order to insure that a workpiece W disposed in pocket 38 will be automatically aligned with a shearing tool blade 88, pocket 38 is equipped with side guide elements 126 affixed to the inside of inner track flanges 106 and the top surfaces of cross beams 110. A guide element 126 is made up of an upstanding beveled plate 128 covered by a guide strip 136. The sides 140 of strips 136 are spaced across from each other at a distance that is somewhat larger than the width of a workpiece W whereby a workpiece W can be readily slipped in the pocket 38 and into contact with the support rolls 114.

Figure 8:
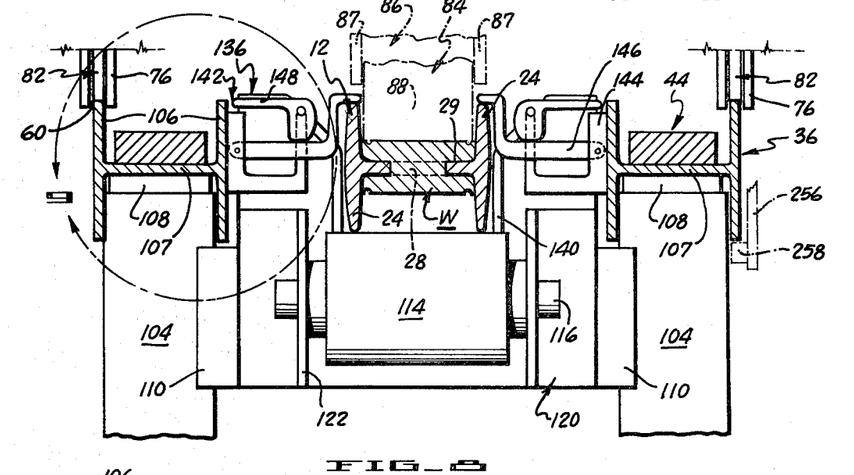
FIG. 8 is an enlarged cross-sectional view taken along line 8—8 of FIG. 1A, with parts removed and other parts broken away.
Figure 9:
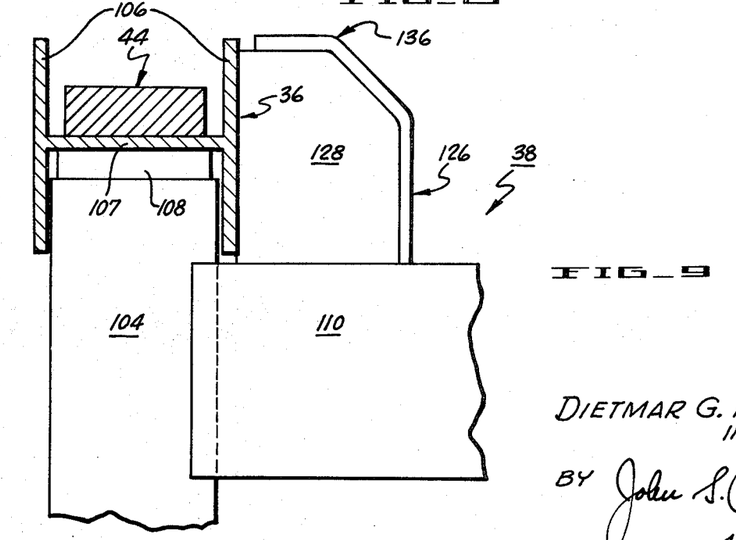
FIG. 9 is an enlarged cross-sectional view taken within the bounds of line 9 of FIG. 8.

In another advantageous embodiment of the instant invention, apparatus 10 can be provided with at least a pair of snap lock clamps 142 disposed transversely of the longitudinal axis of the apparatus for clampingly engaging a workpiece W between he ends thereof when the workpiece is disposed in pocket 38. A clamp 142 includes a channel-shaped mounting bracket 144, a pivotal Z-shaped clamping arm 146 and a manually actuated L-shaped pivotal locking arm 148. When a pair of clamps 142 are in a clamping position, as indicated in FIG. 8, the opposed upper ends of Z-shaped clamping arm 146 do not obstruct the advancement of blade 88 along the path of travel in the upper channel recess of workpiece W during operation of the apparatus.

As indicated in FIGS. 1A and 2, each retractable lug-type element 40 is comprised of a block 150 of roughly rectangular shape. The lower bottom end face 151 of a block 150 has a convex shape and faces towards the carriage. As viewed in FIGS. 1A and 2, channel-shaped brackets 154 are connected to the left-hand end of carriage housing 30 at a location thereon above and in alignment with tracks 36. The width of a block 150 is somewhat less than the channel recess of a bracket 154 whereby the block can be freely inserted in the channel recess of a bracket 154 and slidably mounted between the top and bottom of the bracket recess. The width of a given block 150 is also somewhat less than the upper channel width of a track 36 whereby the lower end of a given block 150 can be lowered into and then retracted out of the upper channel recess of its associated track 36 during operation of the apparatus 10. Each block 150 includes a longitudinally extending closed end slot 156. Each bracket 154 is provided with aligned flange apertures 158, and these aligned apertures are also disposed in alignment with the slot of a block 150 when the block is inserted in the recess of the associated bracket. A pin 160 fits in all of the aforesaid aligned apertures and slots in the blocks and brackets and serves to mount the blocks within their respective brackets and guides 154. If desired, a reinforcing plate 162 can be interposed between and connected to the pair of brackets 154.

A manually operated crank lever device 164 operatively connected to blocks 150 is used to raise and lower anchor blocks 150 in and out of tracks 36. Device 164 includes a lever 166 carried by shaft 168 and shaft 168 is mounted in brackets 170 affixed to the top of carriage plate 52. Actuating arms 172 and chains 174 serve to connect blocks 150 with shaft 168. A lug 176 affixed to carriage 52 is adapted to engage crank arm 166 when the crank arm is in the horizontal position as shown in solid lines in FIG. 1A. At this same time, the lower ends of block elements 150 are in a lowered position for slidably engaging their associated track blocks 44. When, however, arm 166 is moved by the operator clockwise, as indicated in dotted lines in FIG. 1A, to a position where it engages the bottom of fixed lug 176, shaft 168 and a pair of arms 172 affixed thereto are correspondingly rotated and chains 174 and blocks 150 are elevated whereby blocks 150 are released from stop blocks 44 so that carriage 30 can be advanced a selected distance along the frame work. It is to be understood that lever 166 can be pivotally connected to shaft 168 by a pin 168' so that the fork end of lever 166 can be pivoted outwardly to clear lug 176 as it is moved up and down.

As indicated particularly in FIGS. 2, and 5, the second pair of lug-type elements 42 is comprised of a pair of liftable lug-type rods 178. Each rod 178 has a lifting ring 180 at the upper end thereof and is adapted to be inserted in aperture 179 in the shearing tool cross-bar carrier 72. Each aperture 179 is aligned with a track 36. Upstanding grooved brackets 184 are affixed to the top of carrier 72 and disposed between rods 178 therein. A groove 186 of each bracket is adapted to receive a locking pin 182 of an associated rod 178. Pin 182 is attached to a rod 178 intermediate the ends thereof, and after a rod 178 is lifted up and out of engagement with a block 44, it can be held in an elevated position by rotating the pin into registry with groove 186 of the associated bracket. When pin 182 is lifted out of a groove 186 of a bracket 184 and rotated out of the plane of the bracket, rod 178 can be lowered into engagement with the stop block 44. Pin 182 of a given lug-type rod 178 abuts the top of tool bar 72 when the rod is in its lowered position so as to prevent disconnection of the rod therefrom during operation of the apparatus.

Each track block 44 of either series of such blocks has a width that is somewhat less than the width of an upper channel recess of a given track 36, and it is suitably affixed to the top surface of the web of its associated track 106. As indicated in FIGS. 1A–1B, 2 and 5, the left-hand end face 188 of the given block 44, as shown in these drawing figures, is cut away and inclined in an upward and forward direction toward the right-hand end of the block. The right-hand end face 190 of a block 44, however, is not cut away as indicated. For a reason that will become more apparent hereinafter, the distance D between the right-hand end faces 190 of successive blocks of a given series of blocks is somewhat less than the amount of the full stroke S of shearing tool 32. As indicated in FIG. 6, endmost blocks 44' of both series of blocks on opposite sides of pocketway 38 at the right end of framework 34 are not provided with inclined surfaces 188. This is to avoid advancement of carriage 30 beyond the right-hand end of the framework.

It should be observed that the lower ends of blocks 150 and rods 178 when these blocks and rods are positioned in their lowered position as aforedescribed, normally simply slide along the webs 107 of their associated tracks 36 when not engaging blocks 44 during advancement of carriage 30 alone the framework.

The normally upwardly biased rod coupler 48 carried by shearing tool carrier 72 is comprised of a shank 198 that fits in an aperture 200 provided in carrier 72. The aperture 200 is aligned with the workpiece pocket 38. The upper end of shank 198 is provided with an enlarged head 202 from which a lateral pin 204 projects. A coil spring 206 surrounds coupler shank 198 and acts to normally bias the coupler to an upward and out-of-way position relative to a workpiece W disposed in pocket 38, especially during advancement of the carrier 32 to the right, as shown in FIGS. 1A–1B and 5.

An upstanding slotted bracket 208 is affixed to the top of tool carrier 72 and adjacent coupler 48. Coupler 48 can be locked in a lowered position when the coupler is pressed down against the bias of spring 198 by the operator until pin 204 is aligned with the slot 209 of bracket 208 and then rotated until it fits into the slot.

When coupler 48 is lowered, as noted above, the shank 198 can either fit into an opening in the rail web or engage the right-hand end of the base element or rail 12, particularly after the rail has been completely stripped of cladding material, all as indicated in FIG. 4. When the lower end of coupler shank 198 engages the right-hand end of a clad workpiece, carriage 30 along with tool carrier 72 can be advanced from right to left as viewed in FIGS. 1–4 in order to discharge the workpiece base element, or rail, together with the separated lower cladding 18 from the framework pocket 38. A power winch (not shown) can be connected to plate 162 that projects from the left-hand end of the carriage 30 so as to move carriage 30 and tool 32 along with workpiece portions 12 and 18 from left to right in discharging the workpiece, etc., prior to another operative cycle of the apparatus.

In order to facilitate servicing of apparatus 10, carriage 30 can be provided with a U-shaped hoisting bar 248 equipped with a bale or eye element 250 for receiving a chain hook (not shown). If desired, and as noted in FIG. 1A, a portable oil reservoir dispenser device 252 is mounted on tool bar carrier 72 for supplying a selected amount of lubricant to shearing blade 88 during operation of the apparatus.

In order to counteract forces exerted on carriage 30 during removal of upper cladding 16 which would tend to derail carriage 30, the carriage is preferably provided at the ends thereof with hold-don devices 254. Each one of the hold-down devices is comprised of a strap 256 and an idler wheel 258 affixed to the inside and bottom portion of the strap. The wheels 258 of longitudinally aligned straps 256 engage the bottom flange 106 of a given track 36 in the manner indicated in dotted lines in FIG. 8 so as to hold carriage 30 in continual rolling engagement with the tracks 36.

Although not heretofore mentioned, apparatus 10 can be provided with a commercially available vibrator tool 260. As indicated in FIG. 1A, the vibrator tool 260 is affixed to the post of oil dispenser device 252 and includes a reciprocal hammer ram 262 for impacting coupler pin 48 whereby lower cladding 18 can be separated from rail 12 in a similar manner as with the conventional hand hammer H indicated in FIG. 4. Thus upon the vibrator tool impacting the head end 202 of coupling shank 198, the lower end of shank 198 impacts the selected rivet portion 28 of lower cladding 28 so as to progressively separate the same from the rail.

In an advantageous embodiment of the instant invention a clad workpiece W is first inserted in the pocket 38 by hand or by a hoisting device. After positioning and locking workpiece W in a pocket 38 by way of the clamp arms 46, shown in FIG. 8, lug-type blocks 150 are lowered so as to engage selected ones of their associated blocks 44 in the tracks 36 whereby the carriage 30 can be held in a selected stationary position as shearing tool 32 is progressively advanced from left to right, as viewed in the several drawings, and across the web of the rail so as to dislodge and peel the upper cladding 16 from the rail.

Thus, assuming that shearing tool 32 was in a retracted position in FIGS. 1A–1B, and 2, control system 50' is operated to actuate valve 62' and direct fluid under pressure to the left side of piston 69 so as to cause extension of rod 70 and movement of tool carrier 72 along with tool blade 88 across the web 22 of rail 12 for the distance S. In this first stroke S, blade 88 acts like a plow that engages the cladding and progressively separates a portion of the upper cladding 16 from the base element 12 and from lower cladding 18, thereby coiling or rolling up the cladding in snowball fashion. It is to be noted that due to the improved fashion that the blade 88 is mounted, the instant apparatus cleanly, smoothly and progressively shears the cladding from the rail web without either edge or bottom binding or gouging, despite some vertical or lateral deviation of the rail along the length thereof. Simultaneously the movement of blade 88 from left to right in FIGS. 1A–1B effects progressive coiling or snowballing of the separated upper cladding 16 into the coil C. During this first stroke S, the lower ends of the foremost lug-type elements 178 simply slidably engage and ride up and over the various pairs of transversely aligned blocks 44 on tracks 36 by virtue of the left end faces of the blocks 44 being sloped upwardly. Substantially throughout the first tool stroke S the first or rearward air of blocks 150 are disposed in their lowered position and in abutting engagement with the right end face 190 of their respective blocks 144.

As carrier 72 and tool blade 88 advance for the full distance of the first stroke S, the second lugs 178 will have positioned themselves adjacent to right-hand end faces of certain forward blocks 44 in the tracks 36. Thus, when the control system reactuates valve 62' to direct fluid under pressure to the rod side of piston 69, lugs 178 will bear against the stop blocks 44 so that they contact and force carriage 32 to be dragged from left to right as viewed in FIGS. A–1B, and with blocks 150 being allowed to ride up and over various pairs of blocks 44 due to the slack in chains 174 until the blocks 150 come to rest on the right or thrust side of another pair of blocks 44 prior to another stroke S of tool 32 during operation of the apparatus.

During advancement of the carriage 30 from left to right, carriage 30 acts as a walking beam, using the forwardmost lugs 178 in blocks 44 to pull the carriage to a new carriage holding position and using the rearmost lugs 150 and a given set of blocks 44 to anchor and hold carriage 30 stationary as shearing tool 32 along with block 88 is advanced across the workpiece in the manner of a plow. This incremental and progressive advancement of the shearing tool 88 is effected until all of the upper cladding 16 is separated from the rail.

After separation and coiling of upper cladding 16, lower cladding can be separated from the bottom of the web of base 12 when the operator strikes a hammer H against the top side of the web of base element 12 as aforedescribed or operates the impact vibrator tool 260. Upon the base element 12 and lower cladding 18 being separated, they can be discharged together from the left end of pocket 38 when coupler pin 48 is lowered and locked to the right-hand end of the base element and when the carriage 30 is advanced such as, for example, by a power winch (not shown) to the left together with the coupled base element.

If desired, the lower cladding can be removed by inverting the workpiece and resetting the tool 32 for renewed movement from left to right across the web of the base element 12 in the manner aforedescribed. Upon removal of lower cladding 18, any rivet portions 28 remaining in web apertures 26 could be removed such as by an appropriate punchout tool, etc. Thereafter the rail 12 can be reclaimed for future use.

Advantageous embodiments of a workpiece reclaiming device have been shown and described. It is obvious that various changes and modifications may be made therein without departing from the appended claims wherein:

WHAT IS CLAIMED IS:

1. An apparatus for incrementally and progressively separating cladding material or the like from a workpiece, said apparatus comprising the combination of a trackway and carriage means provided with an extensible shearing tool means movable along said trackway, actuator means for said tool means mounted on said carriage means, means for holding a clad workpiece on said trackway in a stationary position relative to said carriage means and said tool means, spaced stop block means on said trackway, a first lug-type element movably mounted on said carriage means and a second lug-type element movably mounted on said tool means, and means for effecting alternate and sequential engagement between certain ones of the stop block means and first one and then the other of said first and second lug-type elements in order to cause alternate and progressive indexing advancement of said carriage means along the trackway and said shearing tool along the length of the clad workpiece so as to effect progressive and incremental separation of the cladding material from the workpiece upon selective actuation of the actuator means.

2. An apparatus as set forth in claim 1 wherein the trackway has a pocket means for receiving the workpiece.

3. An apparatus as set forth in claim 1 wherein the carriage means is provided with hold-down elements for maintaining the carriage in engagement with the trackway during actuation of the tool actuator means.

4. An apparatus as set forth in claim 1 including means for floatably mounting said shearing tool means relative to said trackway and a workpiece disposed thereon.

5. An apparatus as set forth in claim 1 including a carrier device for said shearing tool means, said carrier device being connected to said carriage by said actuator means.

6. An apparatus as set forth in claim 5 including workpiece coupler means mounted on said carrier device for selectively engaging the workpiece and ejecting the workpiece from the trackway.

7. An apparatus as set forth in claim 5 including roller means for maintaining said carrier device on said trackway.

8. An apparatus as set forth in claim 6 in which said coupler includes biasing means for holding said coupler in a raised position relative to said tool means and in spaced relation to a workpiece mounted on said trackway.

9. An apparatus as set forth in claim 1 in which said first lug-type means includes lever and chain means for selectively elevating said first lug-type element relative to said carriage means.

10. An apparatus as set forth in claim 1 including bracket means connected to said tool means for selectively engaging said second lug-type element when said second lug-type element has been elevated relative to said tool means in order to hold said second lug-type element in spaced relation to the stop block means.

11. The apparatus as set forth in claim 1 including a device for lubricating said tool means during operation of said apparatus and carried by said carrier device.

12. An apparatus as set forth in claim 1 in which said tool means includes an arcuate concave surface for coiling up the cladding material as it is separated from the workpiece during operation of the apparatus.

13. An apparatus as set forth in claim 1 including an impact tool means for dislodging a second section of cladding from a workpiece after a first section of cladding has been removed from the workpiece.

14. An apparatus as set forth in claim 1 in which each block of the block means includes an upwardly inclined surface for slidably engaging a first or second lug-type element during advancement of said carriage means and said tool means along said trackway.

15. An apparatus as set forth in claim 1 including means for clamping a workpiece to said trackway.

16. An apparatus as set forth in claim 1 in which said trackway includes a guide plate means and a pocket for receiving and holding a workpiece in a stationary position relative to said carriage means.

* * * * *

UNITED STATES PATENT OFFICE
CERTIFICATE OF CORRECTION

Patent No. 3,673,899          Dated July 4, 1972

Inventor(s)  Dietmar G. Plichta

It is certified that error appears in the above-identified patent and that said Letters Patent are hereby corrected as shown below:

Column 1, line 40, "alone" should be -- along --

Column 2, line 26, "FIG." should be -- FIGS. --

Column 2, lines 43-44, "or most" should be -- or at most --

Column 3, line 63, "form" should be -- from --

Column 4, line 6, "floatable" should be -- floatably --

Column 4, line 31, "excessive movement" should be -- excessive upward movement --

Column 5, line 13, "he" should be -- the --

Column 6, line 38, "alone" should be -- along --

Column 7, line 7, "hold-don" should be -- hold down --

Column 7, line 24, "cladding 28" should be -- cladding 18 --

Column 7, line 60, "air" should be -- pair --

Column 7, line 70, "FIGS. A-1B" should be -- FIGS. 1A-1B --

Signed and sealed this 12th day of December 1972.

(SEAL)
Attest:

EDWARD M. FLETCHER, JR.
Attesting Officer

ROBERT GOTTSCHALK
Commissioner of Patents